United States Patent
Nanba

(10) Patent No.: US 7,680,852 B2
(45) Date of Patent: Mar. 16, 2010

(54) SEARCH PROCESSING METHOD AND SEARCH SYSTEM

(75) Inventor: Isao Nanba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 288 days.

(21) Appl. No.: 11/735,057

(22) Filed: Apr. 13, 2007

(65) Prior Publication Data
US 2008/0097993 A1   Apr. 24, 2008

(30) Foreign Application Priority Data
Oct. 19, 2006  (JP) .............................. 2006-285077

(51) Int. Cl.
*G06F 17/30* (2006.01)
(52) U.S. Cl. .............. 707/706; 707/736; 707/E17.002; 707/E17.008
(58) Field of Classification Search ............... 707/1, 707/2, 3, E17.008
See application file for complete search history.

(56) References Cited

U.S. PATENT DOCUMENTS

| | | | | |
|---|---|---|---|---|
| 5,685,003 | A * | 11/1997 | Peltonen et al. ............. | 715/202 |
| 5,903,890 | A | 5/1999 | Shoji et al. ...................... | 707/3 |
| 6,070,158 | A * | 5/2000 | Kirsch et al. .................... | 707/3 |
| 6,377,946 | B1 * | 4/2002 | Okamoto et al. ............... | 707/5 |
| 2004/0215600 | A1 * | 10/2004 | Aridor et al. ................... | 707/3 |
| 2005/0005237 | A1 * | 1/2005 | Rail et al. ..................... | 715/530 |
| 2005/0068216 | A1 * | 3/2005 | Mulder et al. ............... | 341/154 |
| 2005/0267871 | A1 * | 12/2005 | Marchisio et al. ............. | 707/3 |
| 2006/0031195 | A1 * | 2/2006 | Patterson ....................... | 707/3 |
| 2006/0031207 | A1 * | 2/2006 | Bjarnestam et al. ............ | 707/3 |
| 2006/0075044 | A1 * | 4/2006 | Fox et al. ..................... | 709/206 |
| 2006/0288056 | A1 * | 12/2006 | Yamakawa et al. .......... | 707/203 |
| 2007/0130137 | A1 * | 6/2007 | Oliver et al. .................... | 707/5 |
| 2008/0005097 | A1 * | 1/2008 | Kleewein et al. ............... | 707/5 |
| 2008/0033925 | A1 * | 2/2008 | Richards et al. ................ | 707/3 |
| 2008/0082554 | A1 * | 4/2008 | Pedersen .................... | 707/100 |
| 2008/0091655 | A1 * | 4/2008 | Gokhale et al. ................ | 707/3 |
| 2008/0091666 | A1 * | 4/2008 | Baader et al. .................. | 707/3 |
| 2008/0114738 | A1 * | 5/2008 | Chao ............................. | 707/3 |
| 2008/0162425 | A1 * | 7/2008 | Grennan et al. ................ | 707/3 |

FOREIGN PATENT DOCUMENTS

| JP | 1-98020 | 4/1989 |
|---|---|---|
| JP | 8-272806 | 10/1996 |

* cited by examiner

*Primary Examiner*—Charles Rones
*Assistant Examiner*—Phuong-Thao Cao
(74) *Attorney, Agent, or Firm*—Fujitsu Patent Center

(57) ABSTRACT

A technique to maintain the fast search capability for the large-scale documents without causing the update delay is provided. This search processing method includes: causing an index search unit for carrying out an index search using a search index before document update to carry out the index search relating to a search request, and obtaining a first list of document IDs of pertinent documents; causing a string pattern matching unit having document contents after the document update to carry out a string pattern matching relating to the search request for the document contents after the document update, and obtaining a second list of document IDs of pertinent documents; and generating a search result for the search request by using the first and second lists and a third list of document IDs of documents relating to the document update.

10 Claims, 13 Drawing Sheets

INDEX SEARCH UNIT A

INDEX SEARCH UNIT B

INDEX SEARCH UNIT A

INDEX SEARCH UNIT B

STRING PATTERN MATCHING UNIT A

INDEX SEARCH UNIT A

INDEX SEARCH UNIT B

INDEX SEARCH UNIT A

| INDEX PROCESSOR | | NULL |
|---|---|---|
| UPDATING CANDIDATE DOCUMENT STORAGE | DOCUMENT ID | TEXT |
| | 00001 | those are books |
| | 00007 | that is a pencil |

INDEX SEARCH UNIT A

FIG.20

| DOCUMENT ID MANAGER FOR ADDED OR MODIFIED DOCUMENT | | 00001, 00002, 00003, 00004, 00005, 00007 |
|---|---|---|
| PATTERN MATCHING DOCUMENT STORAGE | DOCUMENT ID | TEXT |
| | 00001 | #those# #are# #books# |
| | 00002 | #this# #is# #a# #pen# |
| | 00003 | #this# #was# #a# #book# |
| | 00004 | #that# #is# #a# #book# |
| | 00005 | #that# #was# #a# #pen# |
| | 00007 | #that# #is# #a# #pencil# |

STRING PATTERN MATCHING UNIT A

FIG.21

| DOCUMENT ID MANAGER FOR ADDED OR MODIFIED DOCUMENT | | 00001, 00007 |
|---|---|---|
| PATTERN MATCHING DOCUMENT STORAGE | DOCUMENT ID | TEXT |
| | 00001 | #those# #are# #books# |
| | 00007 | #that# #is# #a# #pencil# |

STRING PATTERN MATCHING UNIT B

FIG.22

SEARCH PROCESSING METHOD AND SEARCH SYSTEM

TECHNICAL FIELD OF THE INVENTION

This invention relates to a document search technique.

BACKGROUND OF THE INVENTION

Recently, a demand of carrying out a fast text search for a large-scale document set, which is frequently updated, has been occurred. For example, although blogs and news, which are opened on the Internet and the Intranet, are frequently updated, there is a demand of providing these on a search service without any time delay. In addition, in a call center, there is also a demand of carrying out a fast search for a huge volume of (incidents) correspondence records, which have been stored and are received just before, without any time delay of the content change.

For these demands, as a broadly implemented method for the document search, there are two methods: one is a method in which the index is created, and the other is a string pattern matching method for scanning the text of the documents to be searched in order to judge whether or not a search key is contained in the documents to be searched.

The index method is a method for creating the index for the search targets to make the search fast, and the representative one is a method using "inverted file". The "inverted file" is an index structure holding words, which appear in the documents, and the document number sequence. The speed of the search using the "inverted file" is high, the search capability indicates several GB to several ten GB per 1 second by one Central Processing Unit (CPU) (e.g. a CPU whose frequency is 3 GHz), and it is suitable for the large-scale document search. However, because the implementation in which the grand document number sequence is compressed is usual, the updating process is always difficult.

On the other hand, the string pattern matching (also called a pattern matching) is a method for scanning the text to be searched without creating the index to judge whether or not the pattern of the search target exists in the text. When a search mechanism is implemented by using the string pattern matching, the search capability indicates 10 to 100 MB per 1 second by one CPU (e.g. a CPU whose frequency is 3 GHz), and the speed of the search processing is slow. On the other hand, because the index is not used, the updating process is completed only by the update of the search target, and it is easy and has fast.

Incidentally, JP-A-H08-272806 discloses a technique for automatically judging conditions of a searched formula input by a searcher to efficiently carry out a search using merits of the respective search methods, in a database search system capable of executing plural search methods. Specifically, as search means for searching a database in a database storage, for example, index search means and full text search means are provided. Then, the database search system has input means for inputting a search formula; dividing means for dividing the search formula into nominals; assigning means for assigning the respective nominals obtained by the dividing means as a search key to either of the index search means and the full text search means; operation means for carrying out a logical operation for the search results from the index search means and the full text search means based on the aforementioned search formula to output the result of the logical operation as the search result of the search formula to display means. However, this publication does not investigate the update of the database.

In addition, U.S. Pat. No. 5,903,890 discloses a technique capable of carrying out the data search at fast, and effectively utilizing system resources. Specifically, a database system includes a single-coupled database respectively having two coupled data columns; a data base driver respectively executing the search of them; and an interface driver to couple the search result in the database driver. The interface driver instructs the database driver corresponding to the single-coupled database having a desired search item, and by coupling those search results, it obtains the desired search results. Also in this publication, the update of the database is not investigated.

Furthermore, JP-A-H01-98020 discloses a technique in which a cache index is used in addition to a base index having all key values, the update information is temporarily stored in the cache index by update means, and in response to a search request, the search merging both indexes is carried out, and when a portion corresponding to the base index exists in the cache index, the corresponding portion in the cache index is deleted, and the content is reflected to the corresponding portion in the base index. Although the update of the index is discussed, the update of the database is not investigated.

As for the aforementioned "inverted file", because the document number sequences in the index are compressed, the update of the index during the search service is difficult, generally. In order to deal with this problem, a method is adopted in which the index is duplicatively held, and one is used for the search and the other is used for the update in the background, and when the update is completed in the background, the indexes are exchanged. This method causes the delay about several ten minutes for the update completion of the index from the update of the original documents, although it depends on the document scale to be updated.

In addition, in the string pattern matching, although the update speed is high because there is no need to update the index (specifically, it can be presumed that the delay time is zero in actual), the search speed is slow, and when the documents having a volume equal to or more than several GB is searched, a lot of hardware resources are required to hold the documents to be searched, in a distributed manner. This is a large problem.

SUMMARY OF THE INVENTION

Therefore, an object of this invention is to provide a technique to maintain the fast search capability for the large-scale document set without causing the update delay.

In addition, another object of this invention is to provide a technique to suppress the increase of the hardware cost without causing the update delay for the document set.

A search processing method according to a first aspect of this invention includes: causing an index search unit for carrying out an index search using a search index before document update to carry out the index search relating to a search request, and obtaining a first list of document IDs of pertinent documents; causing a string pattern matching unit having document contents after the document update to carry out a string pattern matching relating to the search request for the document contents after the document update, and obtaining a second list of document IDs of pertinent documents; and generating a search result for the search request by using the first and second lists and a third list of document IDs of documents relating to the document update.

Thus, by using the index search unit for portions other than a portion relating to the update, and by using the string pattern matching unit for the portion relating to the update, the speed of the search is maintained to be high. Incidentally, the processing by the index search unit and the string pattern matching unit can be carried out in parallel.

In addition, the aforementioned generating may include: generating a fourth list by removing the document IDs included in the third list from the first list; and generating a sum-set of the fourth list and the second list. Thus, it is possible to return the adequate search result by the simple logical operation.

In addition, the aforementioned causing the index search unit may include carrying out a normalization processing for the index search against a search word relating to the search request. Moreover, the aforementioned causing the string pattern matching unit may include carrying out a normalization processing for the string pattern matching against a search word relating to the search request. This is for speed-up of the search.

In addition, a search system according to a second aspect of this invention includes: a first search index used for carrying out an index search in response to a search request; a first document ID manager, for added or modified document, that stores document IDs of updated documents and is used in the search; and a first pattern matching document storage that stores data of the updated documents to carry out a character string in the search. Then, the index search relating to the search request is carried out by using the first search index to obtain a first list of document IDs of pertinent documents, and a string pattern matching relating to the search request is carried out for the first pattern matching document storage to obtain a second list of document IDs of pertinent documents, and by using the first list, the second list and the document IDs stored in the first document ID manager, a search result for the search request is generated. This is a configuration enabling the fast search while reducing the update delay.

Furthermore, a search system according to a third aspect of this invention includes: a first search index that is used to carry out an index search in response to a search request; a second search index that is used to reflect first updated documents; a first updating candidate document storage that stores data of second updated documents since a reflection processing of the first updated documents against the second search index began; a second updating candidate document storage that stores data of the first updated documents used for the reflection processing against the second search index; a first document ID manager, for added or modified document, that stores document IDS of the first updated documents and is used in the search; a first pattern matching document storage that stores the data of the first updated documents to carry out a string pattern matching in the search; a second document ID manager, for added or modified document, that stores document IDs of the second updated documents since the reflection processing of the first updated documents against the second search index began; a second pattern matching document storage that stores the data of the second updated documents since the reflection processing of the first updated documents against the second search index began; Then, when the reflection processing of the first updated documents against the second search index is completed, the second search index after the reflection processing is used as the first search index to switch the first and second search indexes, and the data of the second updated documents, which is stored in the first updating candidate document storage, is moved to the second updating candidate document storage by overwriting, and the document IDs of the second updated documents, which are stored in the second document ID manager, are moved to the first document ID manager by overwriting, and the data of the second updated documents, which is stored in the second pattern matching document storage, is moved to the first pattern matching document storage by overwriting.

By carrying out such a processing, it is possible to suppress the increase of the hardware cost without causing the update delay for the document set. That is, the search system separately has a resource used for the search and a resource to carry out preparation for the document update, and by simultaneously carrying out the aforementioned processing, it is possible to control the occurrence of the large delay for a response to the searcher without causing the update delay.

In addition, before the reflection processing of the first updated documents for the second search index begins, data of an updated document relating to a new update request may be stored into the first and second updating candidate document storages. In such a case, a document ID of the update document relating to the new update request may be stored into the first document ID manager, and the data of the updated document relating to the new update request may be stored in the first pattern matching document storage.

Furthermore, after the reflection processing of the first updated document against the second search index began, the first updating candidate document storage may be cleared. In such a case, data of an updated document relating to a new update request may be stored in the first updating candidate document storage, and a document ID of the updated document relating to the new update request may be stored into the first and second document ID managers, and the data of the updated document relating to the new request may be stored in the first and second pattern matching document storages.

Furthermore, the search relating to a search request may be caused by the first search index to obtain a first list of document IDs of pertinent documents, the string pattern matching relating to the search request may be carried out for the first pattern matching document storage to obtain a second list of document IDs of pertinent document, and by using the first list, the second list and the document IDs stored in the first document ID manager, a search result for the search request may be generated.

In addition, the updated document stored in the first and second updated candidate document storages may be normalized for the search index, and the data of the updated documents stored in the first and second pattern matching document storages may be normalized for the string pattern matching.

Incidentally, it is possible to create a program for causing a computer to execute the search processing method according to the present invention. The program is stored into a storage medium or a storage device such as, for example, a flexible disk, a CD-ROM, a magneto-optical disk, a semiconductor memory, or a hard disk. In addition, the program may be distributed as digital signals over a network in some cases. Data under processing is temporarily stored in the storage device such as a computer memory.

BRIEF DESCRIPTION OF THE DRAWINGS

FIG. 20 is a diagram showing a state of the index search unit A;

FIG. 21 is a diagram showing a state of the string pattern matching unit A;

FIG. 22 is a diagram showing a state of the string pattern matching unit B;

DETAILED DESCRIPTION OF THE PREFERRED EMBODIMENTS

Figure 1:
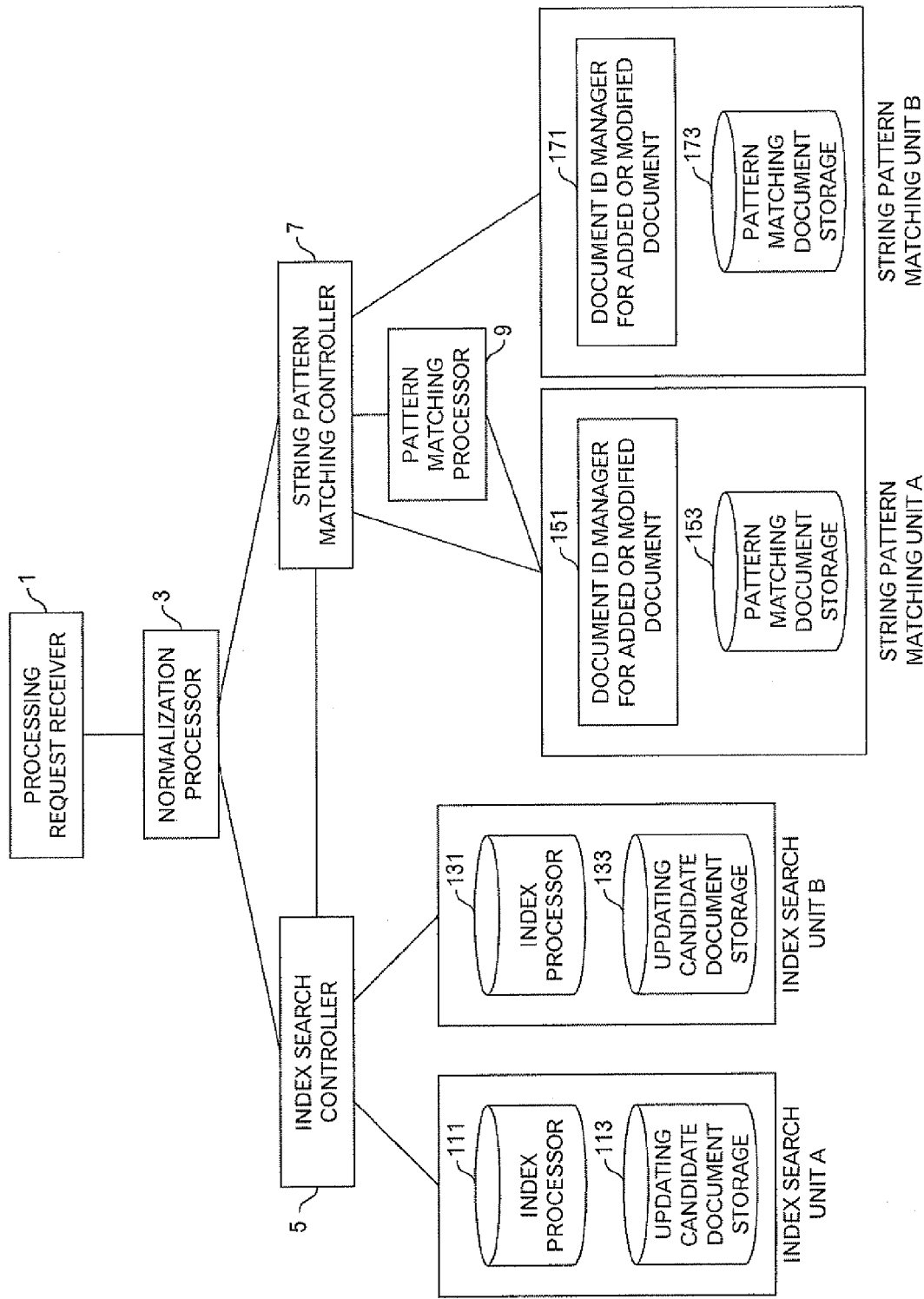
FIG. 1 is a system outline diagram in an embodiment of this invention.

FIG. 1 shows a system outline diagram of a search system according to an embodiment of this invention. The search system according to this embodiment has a processing request receiver 1 that accepts processing requests such as a search request from a user or the like; a normalization processor 3 that carries out a normalization processing for an index search unit and a normalization processing for a string pattern matching unit, against search words relating to the search request, a document relating to a document update request and the like; index search units A and B; an index search controller 5 that carries out a control described later in detail for the index search units A and B in response to the data from the normalization processor 3; string pattern matching units A and B; a pattern matching processor 9 that carries out a string pattern matching relating to the search request for the string pattern matching unit A; and a string pattern matching controller 7 that carries out a control described later in detail for the pattern matching processor 9 and the string pattern matching units A and B in response to the data from the normalization processor 3.

The index search unit A is for the search, and has an index processor 111 having a search index, and an updating candidate document storage 113. The index search unit B is for the update, and has an index processor 131, and an updating candidate document storage 133. The index search units A and B are to carry out a well-known index search, and the index processor 111 holds the search index generated at a predetermined timing.

The index controller 5 jointly operates with the character string controller 7.

The string pattern matching unit A is for the search, and has a document ID manager 151 for added or modified document, and a pattern matching document storage 153. The string pattern matching unit B is for the update, and has a difference document ID manage 171, and a pattern matching document storage 173. The string pattern matching units A and B are to carry out a well-known string pattern matching (i.e. pattern matching), and the document content updated at and after the predetermined timing is held in the pattern matching document storage 153, and the document ID manager 151 holds a list of the document IDs of the documents updated at and after the predetermined timing.

Incidentally, although it is assumed that the search system is connected to a network, for example, and the search request or the like is received from another computer connected to the network, the search system may be configured in a stand-alone style.

Figure 2:
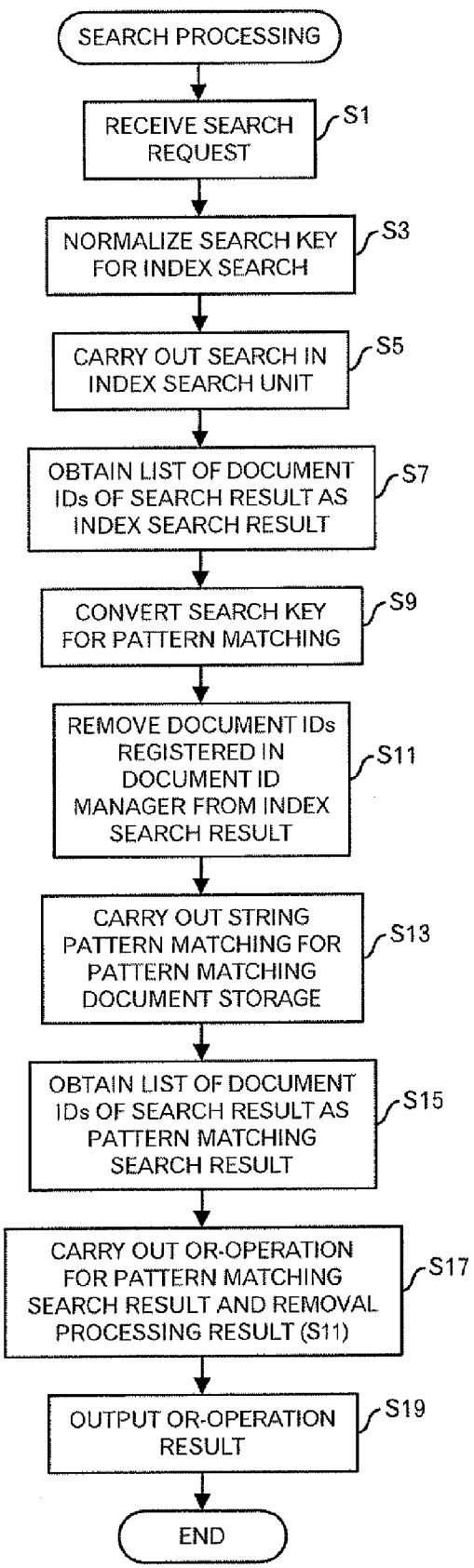
FIG. 2 is a diagram showing a processing flow of a search processing.

Next, the search processing in the search system shown in FIG. 1 will be explained by using FIG. 2. First, the processing request receiver 1 receives a search request containing a search key (i.e. search word) via the network (step S1), and outputs the search request including the search key to the normalization processor 3. When receiving the search request including the search key from the processing request receiver 7, the normalization processor 3 normalizes the search key for the index, and stores the normalization result into a storage device such as a main memory (step S3). Although the processing content of the normalization processor 3 will collectively be explained later, it suppresses the difference between the index search and the string pattern matching with a normalization rule. For example, because the string pattern matching matches an arbitrary substring in a document searching "is" hits "is" in a document containing "this". However, when the index is constructed by a word unit, "is" does not match with an arbitrary substring of "this". Because it happens that even if the documents containing the same word are processed, the result between index search and string pattern matching may differs, a rule to suppress such case is the normalization rule. In this embodiment, as a common normalization, a case folding is carried out, and the normalization of adding "#" to the head and tail of word is carried out for the string pattern matching, and a stemming is suppressed for the index when assuming that the index is generated by a word unit. Then, the normalization processor 3 outputs the search request containing the normalized search key to the index search controller 5.

When receiving the search request containing the normalized search key from the normalization processor 3, the index search controller 5 transfers the search request to the index search unit A.

When receiving the search request from the index search controller 5, the index search unit A carries out a well-known index search by the index processor 11 (step S5). Then, the index processor 111 of the index search unit A outputs the search result to the index search controller 5. The search result is a list of the document IDs, and here it is assumed that the list includes documents 1, 3, 5 and 13, for example. The index search controller 5 receives the list of the document IDs as the search result from the index processor 111 (step S7), and stores the list into the storage device such as the main memory, and outputs the list of the document IDs as the search result to the string pattern matching controller 7. The string pattern matching controller 7 receives the list of the document IDs, which is the search result of the index search.

In addition, the normalization processor 3 normalizes (i.e. converts) the search key included in the search request received from the processing request receiver 1 for the pattern matching (i.e. for the string pattern matching) (step S9). For example, according to the common normalization rule, the case folding is carried out, and "#" is arranged before and after a token of an alphabet sequence. For example, when "This" is processed, "#this#" is obtained. The normalization processor 3 outputs the search request containing the search key converted for the pattern matching.

Furthermore, the string pattern matching controller 7 obtains a list of the document IDs registered in the document ID manager 151 from the document id manager 151 of the string pattern matching unit A, removes the obtained list of the document IDs from the list of the document IDs, which is the search result of the index search received from the index search controller 5 by subtraction, and stores a list of remaining document IDs into the storage device such as the main memory (step S11). The document ID manager 151 holds the list of the document IDs of the documents updated after the current search index being used in the index processor 111 is generated. Therefore, even if the result of the index search includes the document ID included in the list of the document IDs, which is held by the document ID manager 151, it cannot be trusted. Therefore, in this step, the document IDs included in the list of the document IDs, which is held by the document ID manager 151, is removed from the list of the document IDs, which is the search result of the index search. For example, when the document IDs held by the document ID manager 151 are documents 5, 28 and 34, the document 5 is removed because it is duplicated with the search result of the index search, and the remaining documents are documents 1, 3 and 13.

When receiving the search request containing the converted search key from the normalization processor 3, the string pattern matching controller 7 outputs the converted search key to the pattern matching processor 9, and causes the pattern matching processor 9 to carry out a well-known string pattern matching for the pattern matching document storage 153 (step S13). The pattern matching processor 9 uses the converted search key to scan in the pattern matching document storage 153 holding the content of the documents after the target documents of index search is modified (or new documents are added), and outputs a list of the document IDs of pertinent documents to the string pattern matching controller 7. The string pattern matching controller 7 receives the list of the document IDs, which is the search result of the pattern matching search, and stores the pattern matching search result into the storage device such as the main memory (step S15). For example, it is assumed that the documents 1, 8, 28 and 34 are obtained as the processing result.

Then, the string pattern matching controller 7 carries out an OR operation (i.e. generates a sum-set) for the list of the document IDs, which is the pattern matching search result, and the list of the remaining document IDs, which was obtained as the processing result of the step S11 (i.e. removing processing result), and stores the operation result into the storage device such as the main memory (step S17). By this processing, the search result is generated in a manner that the update content of the documents updated after the current search index was generated is reflected. For example, the list of the remaining document IDs includes the documents 1, 3 and 13, and the pattern matching search result includes the documents 1, 8, 28 and 34. Therefore, the sum-set includes the documents 1, 3, 8, 13, 28 and 34.

After that, for example, the string pattern matching controller 7 outputs the result of the OR operation (i.e. the list of the document IDs) to a user terminal of a requesting source (step S19).

Thus, the index search is carried out for the huge volume of documents by the index search unit A, and the string pattern matching is carried out against the string pattern matching unit A for the small volume of updated documents in parallel by the pattern matching processing 9. Therefore, the fast search is kept and the adequate search result can be obtained.

Next, the updating process will be explained by using FIGS. 3 to 26. First, a starting process of updating (resolving) index difference will be explained by using FIG. 3. First, when the starting process of updating (resolving) index difference is instructed from an administrator terminal, or the starting process of updating (resolving) index difference is automatically instructed at an arbitrary timing or periodically, for example, the index search controller 5 sets "ON" to its index flag of starting updating (resolving) difference and an index flag of starting updating (resolving) difference in the string pattern matching controller 7 (step S21). Then, the index search controller 5 clears the updating candidate document storage 113 of the index search unit A (step S23). Although it is described later, the updating candidate document storage 113 stores the content of the documents updated after the current search index generation began, and the content is cleared. Incidentally, the content may be stored into other storage device for the backup.

Furthermore, the index search controller 5 causes the index processor 131 of the index search unit B to carry out an updating process to reflect the documents held in the updating candidate document storage 133 to its the search index (step S25). The updating candidate document storage 133 holds the content of the documents relating to the update request received after the previous updating process for the search index of the index search unit B began. In order to reflect the content updated after the previous updating process began, the updating of search index starts.

Next, the process will be explained by using FIGS. 4 to 22, which will be executed when an update request of a document to be search is received from another computer, an updated document obtaining unit (not shown) of the search system, a user terminal or the like. First, the processing request receiver 1 receives a document update request containing the document content after the update from another computer, the updated document obtaining unit of the search system, the user terminal or the like, and outputs the document update request to the normalization processor 3. Then, the normalization processor 3 notifies the index search controller 5 and the string pattern matching controller 7 of a message to the effect that the document update request was received.

Then, the index search controller 5 carries out a write-lock for the index search units A and B, and the string pattern matching controller 7 carries out a write-lock for the string pattern matching units A and B.

In addition, the normalization processor 3 normalizes the content of the document relating to the document update request for the index, and stores the normalization result into the storage device such as the main memory, and outputs it to the index search controller 5 (step S35). The index search controller 5, which received the normalized document content relating to the document update request, judges whether or not its index difference start flag is "ON" (step S37). When the index difference start flag is "OFF", the index search controller 5 registers the normalized document content relating to the document update request to the updating candidate document storage 133 of the index search unit B (step S39).

In addition, even when the index difference start flag is "ON" or "OFF", the index search controller 5 registers the normalized document content relating to the document update request into the updating candidate document storage 113 of the index search unit A (step S41).

Figure 5:
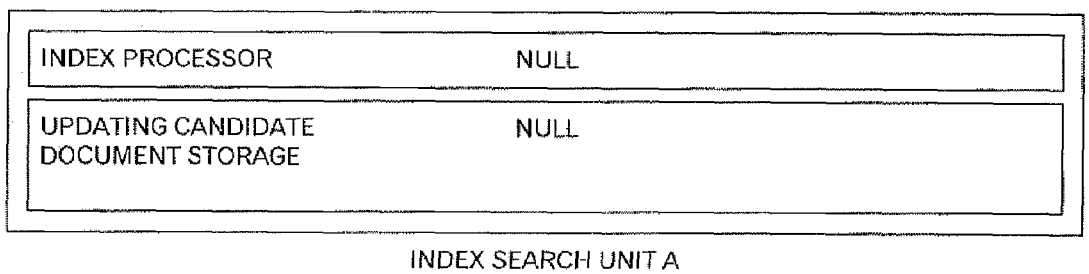
FIG. 5 is a diagram showing an initial state of an index search unit A.
Figure 6:
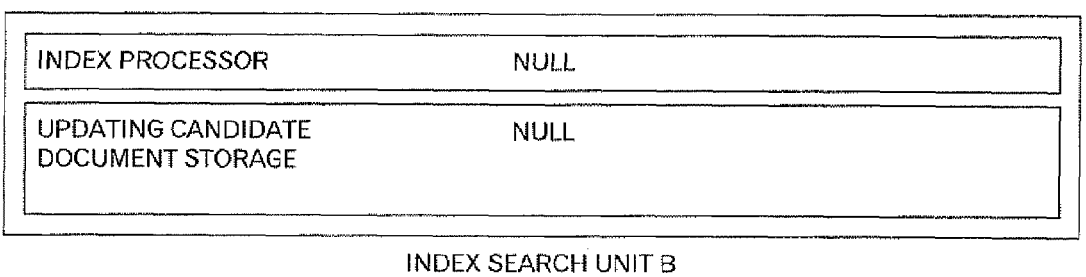
FIG. 6 is a diagram showing an initial state of an index search unit B.

By using FIGS. 5 to 8, the processing content up to here will be explained. For example, as shown in FIGS. 5 and 6, it is assumed that the search index of the index processor 111 in the index search unit A and the search index of the index processor 131 in the index search unit B are also null, and the updating candidate document storage 113 of the index search unit A and the updating candidate document storage 133 of the index search unit B are also null (empty).

Then, a document content "This is a book" of the document ID "00001", a document content "This is a pen" of the document ID "00002", a document content "This was a book" of the document ID "00003", a document content "That is a book" of the document ID "00004", a document content "That was a pen" of the document ID "00005" are designated in the document update request.

Figure 7:
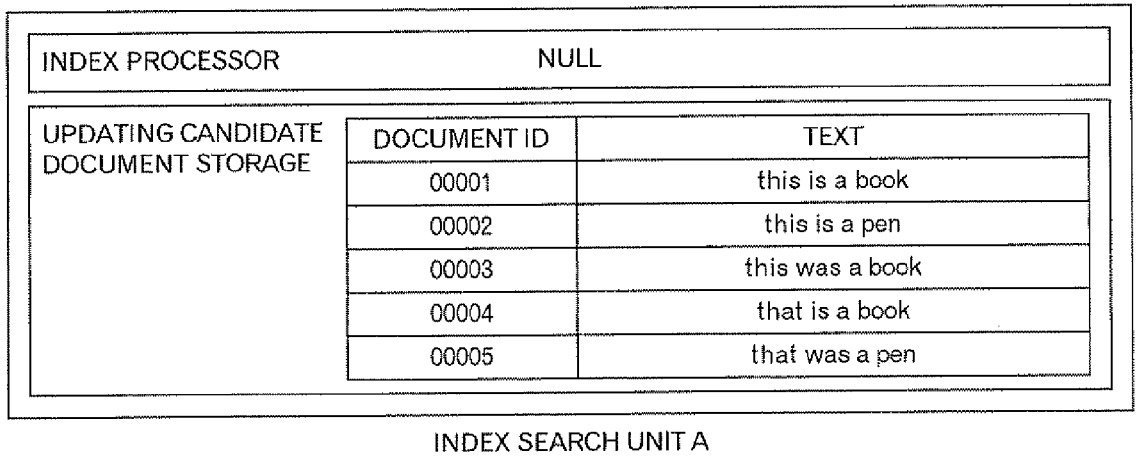
FIG. 7 is a diagram showing a state of the index search unit A.
Figure 8:
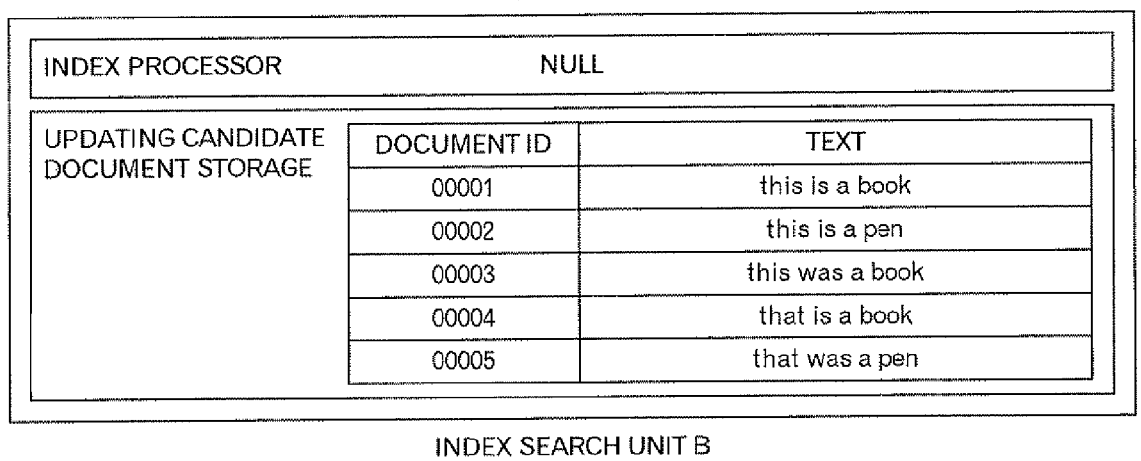
FIG. 8 is a diagram showing a state of the index search unit B.

Then, when the index flag of starting updating (resolving) difference is "OFF", at the steps S39 and S41, as shown in FIGS. 7 and 8, the normalized document contents ("This" is normalized to "this", and "That" is normalized to "that") are registered into the updating candidate document storage 113 of the index search unit A and the updating candidate document storage 133 of the index search unit B. Incidentally, when the index flag of starting updating (resolving) difference is "ON", the updated content is registered into only the candidate document storage 113 of the index search unit A.

Figure 4:
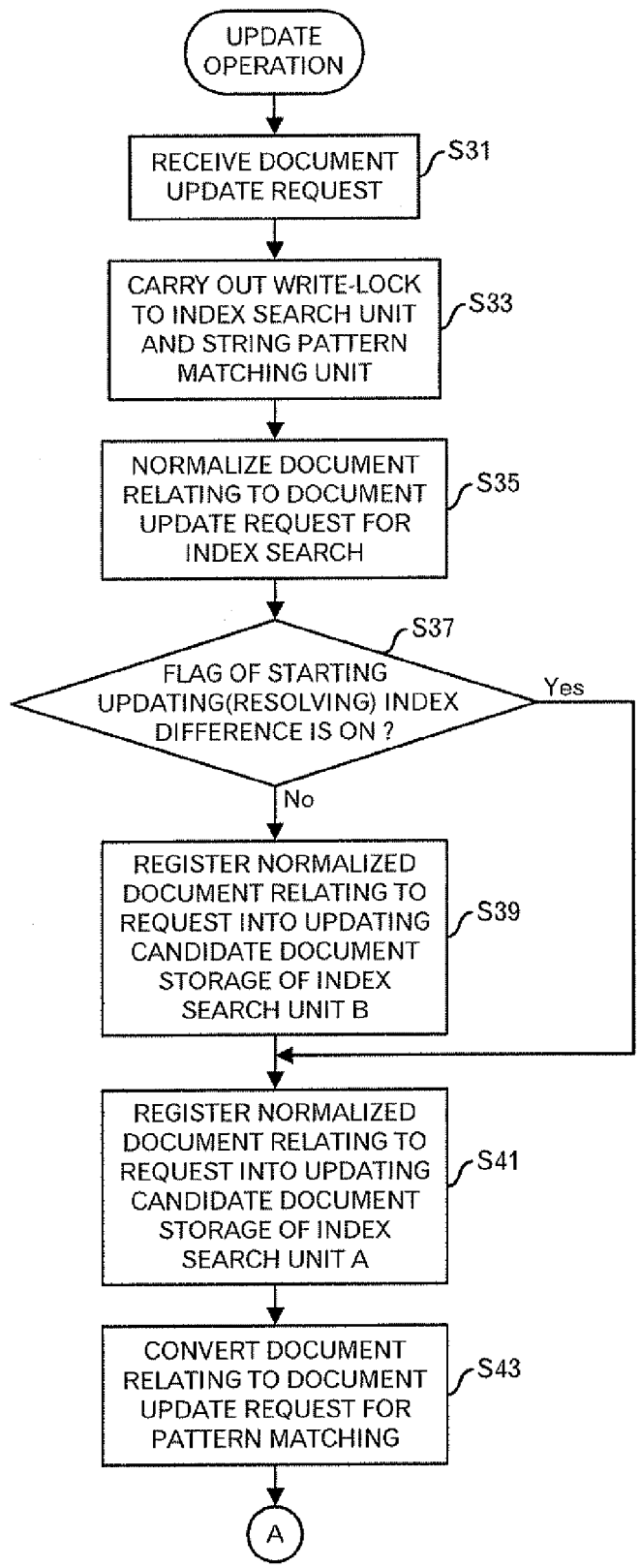
FIG. 4 is a diagram showing a first portion of a processing flow of an updating process.

Returning to the explanation of FIG. 4, in parallel with the steps S37 to S41, the normalization processor 3 converts (i.e. normalizes) the content of the document relating to the document update request for the pattern matching, and stores the converted content into the storage device such as the main memory, and outputs the converted content to the string pattern matching controller 7 (step S43). The processing shifts to a processing flow of FIG. 9 via a terminal A.

The string pattern matching controller 7 judges whether or not its index flag of starting updating (resolving) difference is "ON" (step S44). When the index flag of starting updating (resolving) difference is "ON", the string pattern matching controller 7 registers the converted content of the document relating to the document search request into the pattern matching document storage 173 of the string pattern matching unit B (step S45). In addition, the string pattern matching controller 7 registers the document ID of the document relating to the document update request into the document ID manager 171 of the string pattern matching unit B (step S47).

In addition, even when the index flag of starting updating (resolving) difference is "OFF" or "ON", the string pattern matching controller 7 registers the converted content of the document relating to the document update request into the pattern matching document storage 151 of the string pattern matching unit A (step S49). In addition, the string pattern matching controller 7 registered the document ID of the document relating to the document update request into the document ID manager 151 of the character string unit A (step S51).

Figure 10:
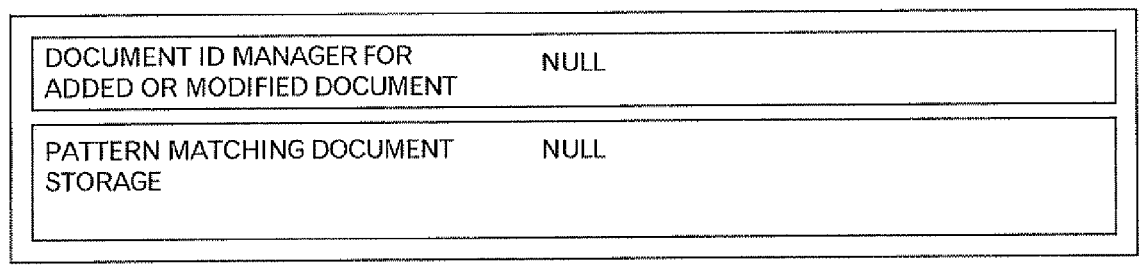
FIG. 10 is a diagram showing an initial state of a string pattern matching unit A.
Figure 9:
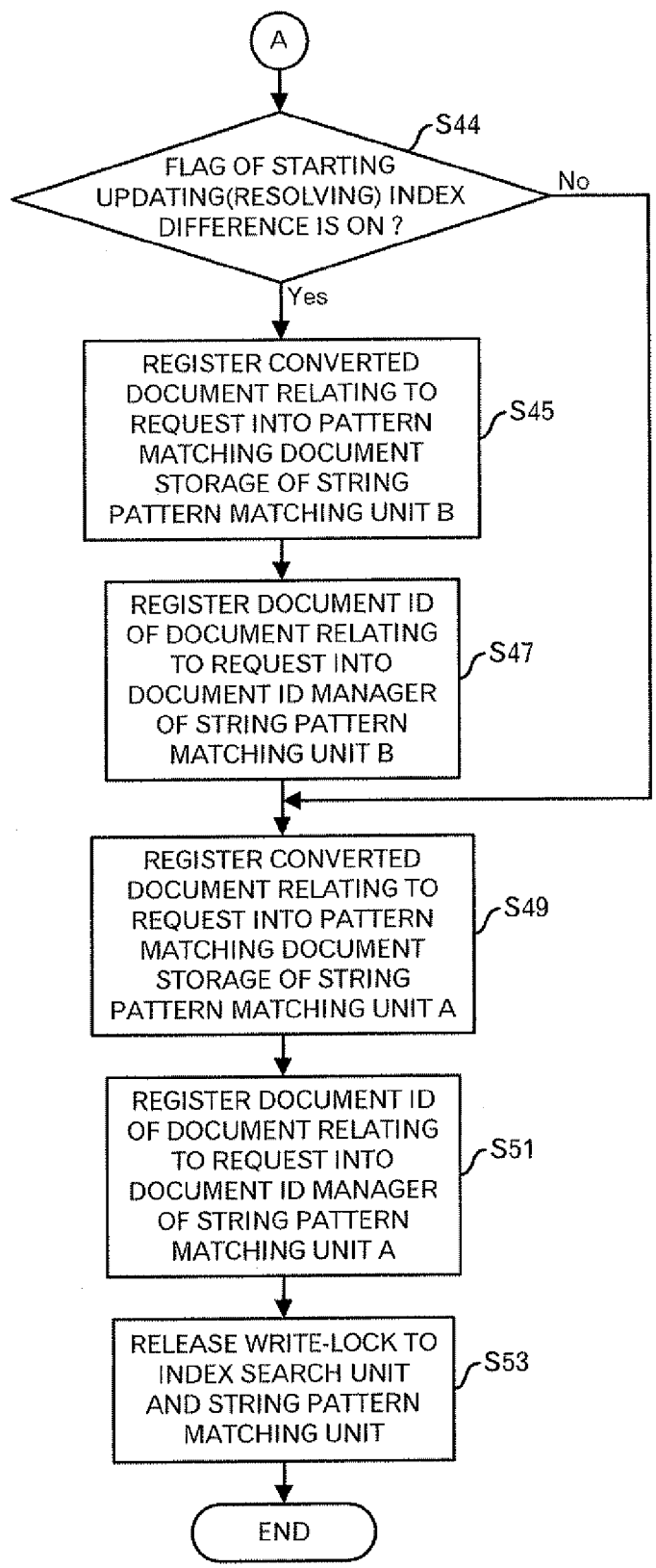
FIG. 9 is a diagram showing a second portion of the processing flow of the updating process.
Figure 11:
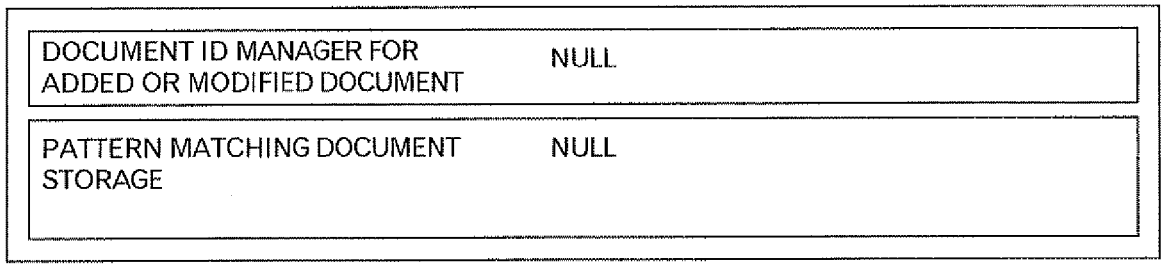
FIG. 11 is a diagram showing an initial state of a string pattern matching unit B.

By using FIGS. 10 to 13, the processing of the step S44 to S51 will be explained. First, as the presumption, as shown in FIGS. 10 and 11, the document ID manager 151 of the string pattern matching unit A and the document ID manager 171 of the string pattern matching unit B are also null, and the pattern matching document storage 153 of the string pattern matching unit A and the pattern matching document storage 173 of the string pattern matching unit B are also null.

Figure 12:
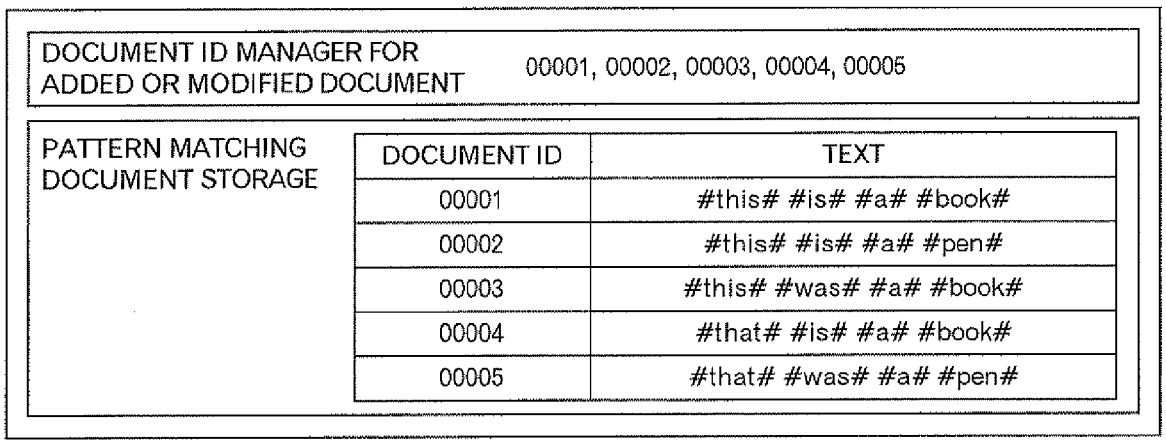
FIG. 12 is a diagram showing a state of the string pattern matching unit A.
Figure 13:
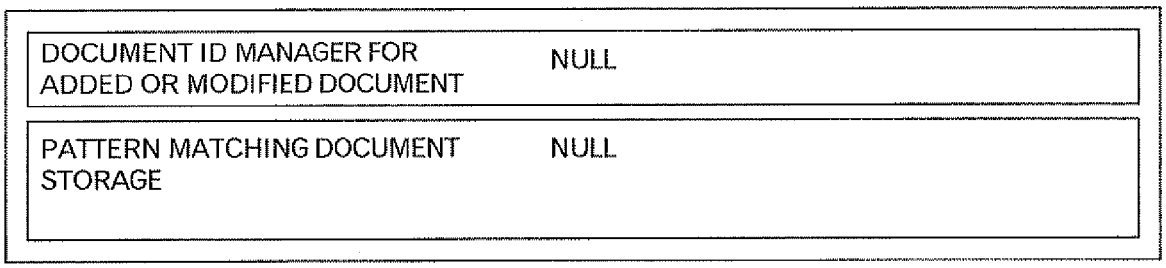
FIG. 13 is a diagram showing a state of the string pattern matching unit B.

After that, when the aforementioned document update request is received, as shown in FIGS. 12 and 13, the normalized document contents ("This is a book" is normalized to "#this# #is# #a# #book#") are stored into only the pattern matching document storage 153 of the string pattern matching unit A when the index flag of starting updating (resolving) difference is "OFF". The document IDs ("00001" to "00005") of the updated documents are also registered into only the document ID manager 151 of the string pattern matching unit A.

On the other hand, when the index flag of starting updating (resolving) difference is "ON", the normalized contents are stored into both the pattern matching document storage 153 of the string pattern matching unit A and the pattern matching document storage 173 of the string pattern matching unit B. In addition, the document IDs of the updated documents are also registered into both of the document ID manager 151 of the string pattern matching unit A and the document ID manager 171 of the string pattern matching unit B.

Then, the index search controller 5 releases the write-lock of the index search units A and B, and the character string controller 7 releases the write-lock of the string pattern matching units A and B (step S53).

By carrying out such a processing, the fast search is enabled while the document update is treated.

Incidentally, in order to make this embodiment comprehensible, a case where the following processing is carried out after FIGS. 5 to 8 and FIGS. 10 to 13 will be explained specifically. First, when a search request containing a search key "IS" is received, the normalization processor 3 normalizes it for the index search to "is", and converts it to "#is#" for the string pattern matching. Although the index search is carried out based on this "is" by the index processor 111 of the index search unit A, the search result from the index processor 111 of the index search unit A is "null" because the search index is also "null". In addition, even when the string pattern matching controller 7 receives the list of the document IDs from the document ID manager 151 of the string pattern matching unit A, the subtraction result is also "null" because the search result of the index search, which was received from the index search controller 5, is null. Then, when the pattern matching processor 9 carries out the pattern matching processing based on "#is#" for the pattern matching document storage 153 of the string pattern matching unit A, the pattern matching processor 9 can obtain the document IDs "00001", "00002" and "00004". Then, the string pattern matching controller 7 generates the sum-set of "null" and the document IDs "00001", "00002" and "00004", and outputs the document IDs "00001", "00002" and "00004" as the search result.

Figure 3:
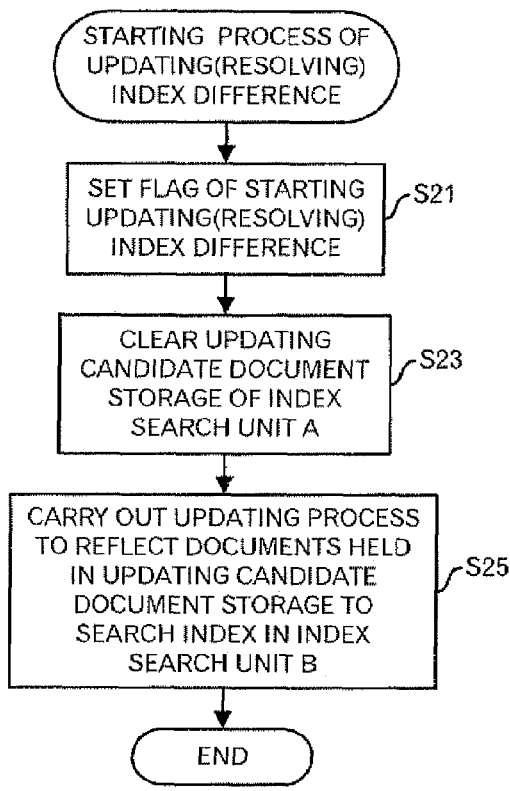
FIG. 3 is a diagram showing a processing flow of a starting process of updating (resolving) index difference.
Figure 14:
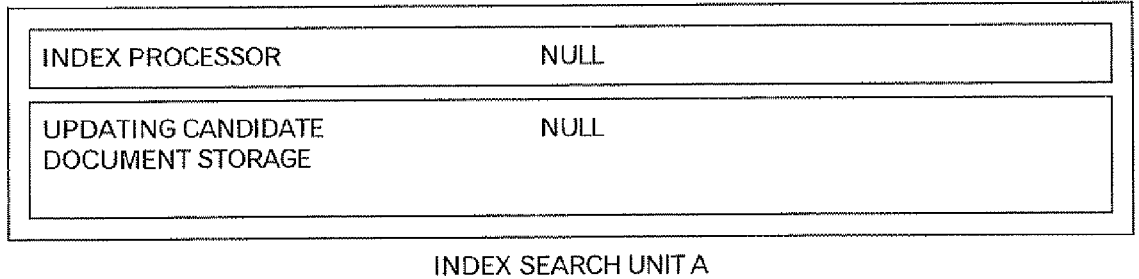
FIG. 14 is a diagram showing a state of the index search unit A.
Figure 15:
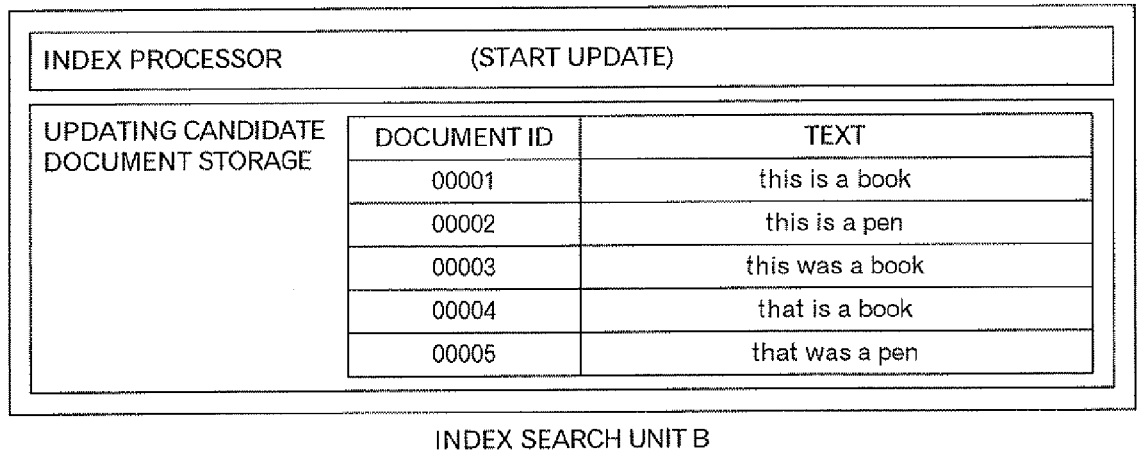
FIG. 15 is a diagram showing a state of the index search unit B.

Next, when the starting process of updating (resolving) index difference is carried out, the processing according to FIG. 3 is carried out, and as shown in FIG. 14, the updating candidate document storage 113 of the index search unit A is cleared and becomes "null". In addition, as shown in FIG. 15, the index processor 131 of the index search unit B starts a processing (i.e. the updating process) to reflect the content of the updated documents stored in the updating candidate document storage 133 to its search index.

Figure 16:
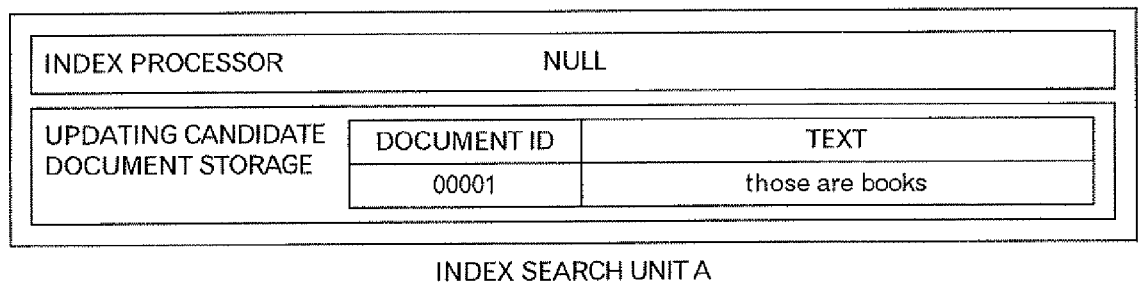
FIG. 16 is a diagram showing a state of the index search unit A.
Figure 17:
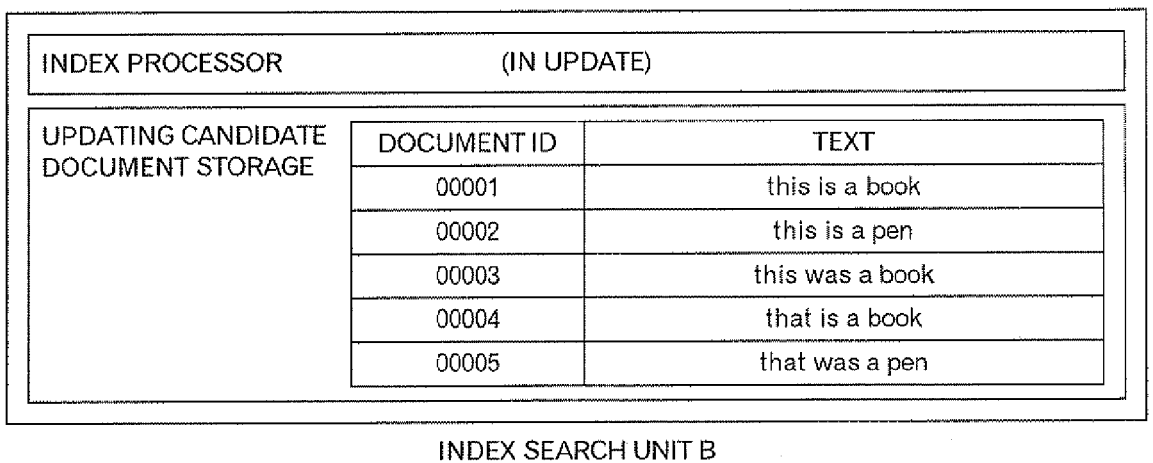
FIG. 17 is a diagram showing a state of the index search unit B.

After that, when the document update request to change the document content of the document ID "00001" to "Those are books" is received, the normalization processor 3 normalizes the document content to "those are books" for the index, and as shown in FIG. 16, the index search controller 5 registers the document ID and updated document content to the updating candidate document storage 113 of the index search unit A. However, as shown in FIG. 17, the index processor 131 of the index search unit B is carrying out the updating process, and does not carry out the update for the updating candidate document storage 133.

Figure 18:
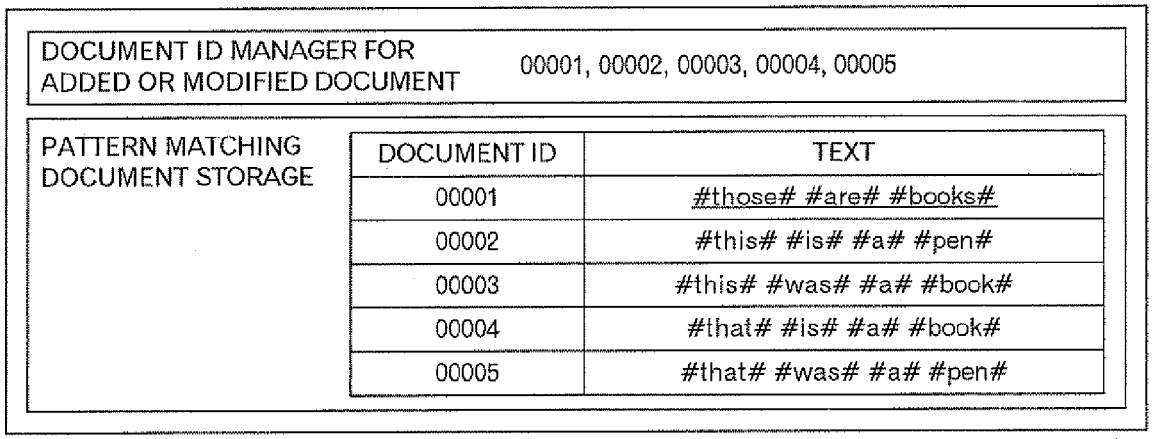
FIG. 18 is a diagram showing a state of the string pattern matching unit A.
Figure 19:
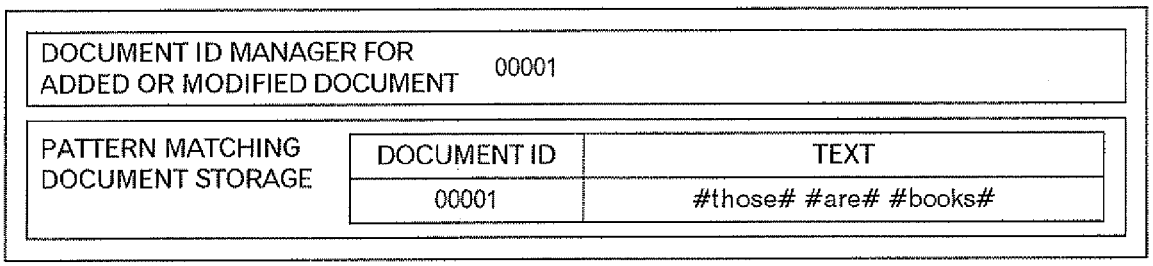
FIG. 19 is a diagram showing a state of the string pattern matching unit B.

In addition, the normalization processor 3 converts the updated content to "#those# #are# #books#" for the pattern matching, and the string pattern matching controller 7 registers the document ID "00001" of the document relating to the document update request into the document ID manager 151 of the string pattern matching unit A. However, the document ID "00001" has already been registered. Therefore, there is no change. In addition, as shown in FIG. 18, the pattern matching document storage 153 of the string pattern matching unit A registers the document ID of the document relating to the document update request and the converted update content. In FIG. 18, the underline is drawn under the updated portion. Furthermore, as shown in FIG. 19, the document ID of the document relating to the document update request and the converted update content are registered into the pattern matching document storage 173 of the string pattern matching unit B. As shown in FIG. 13, when the index flag of starting updating (resolving) difference is "OFF", because any data is not registered in both of the document ID manager 171 and the pattern matching document storage 173, the document ID of the document relating to this document update request and the converted update content are firstly registered.

Furthermore, when a document update request to add a document content "That is a pencil" of the document ID "00007" is received, the normalization processor 3 normalizes the document content to "that is a pencil" for the index, and as shown in FIG. 20, the index search controller 5 registers the document ID and the normalized document content into the updating candidate document storage 113 of the index search unit A. However, the index processor 131 of the index search unit B are carrying out the updating process, and does not update the updating candidate document storage 133.

In addition, the normalization processor 3 converts the update content to "#that# #is# #a# #pencil#", and as shown in FIG. 21, the string pattern matching controller 7 registers the document ID "00007" of the document relating to the document update request into the document ID manager 151 of the string pattern matching unit A. In addition, the document ID of the document relating to the document update request and the added and normalized document content are registered into the pattern matching document storage 153 of the string pattern matching unit A. In FIG. 21, the underline is drawn under the updated portion. Furthermore, as shown in FIG. 22, the document ID of the document relating to the document update request and the added and normalized document content are registered into the pattern matching document storage 173 of the string pattern matching unit B.

Here, when a search request containing a search key "IS" is received, the normalization processor 3 normalizes the search key to "is" for the index search, and converts the search key to the "#is#" for the string pattern matching. Although the index search is carried out based on this "is" by the index processor 111 of the index search unit A, because the search index is "null", and the search result from the index processor 111 of the index search unit A is "null".

In addition, even when the string pattern matching controller 7 receives the list of the document IDs, which is held by the document ID manager 151 of the string pattern matching unit A, because the search result of the index search, which was received from the index search controller 5, is "null", the result of the subtraction is also "null". Then, when the pattern matching processor 9 carries out the pattern matching processing, based on "#is#" after the conversion, for the pattern matching document storage 153 of the string pattern matching unit A, the pattern matching processor 9 can obtain the document IDs "00002", "00004" and "00007". Then, the string pattern matching controller 7 generates the sum-set of "null" and the document IDs "00002", "00004" and "00007", and outputs the document IDs "00002", "00004" and "00007" as the search result.

Figure 23:
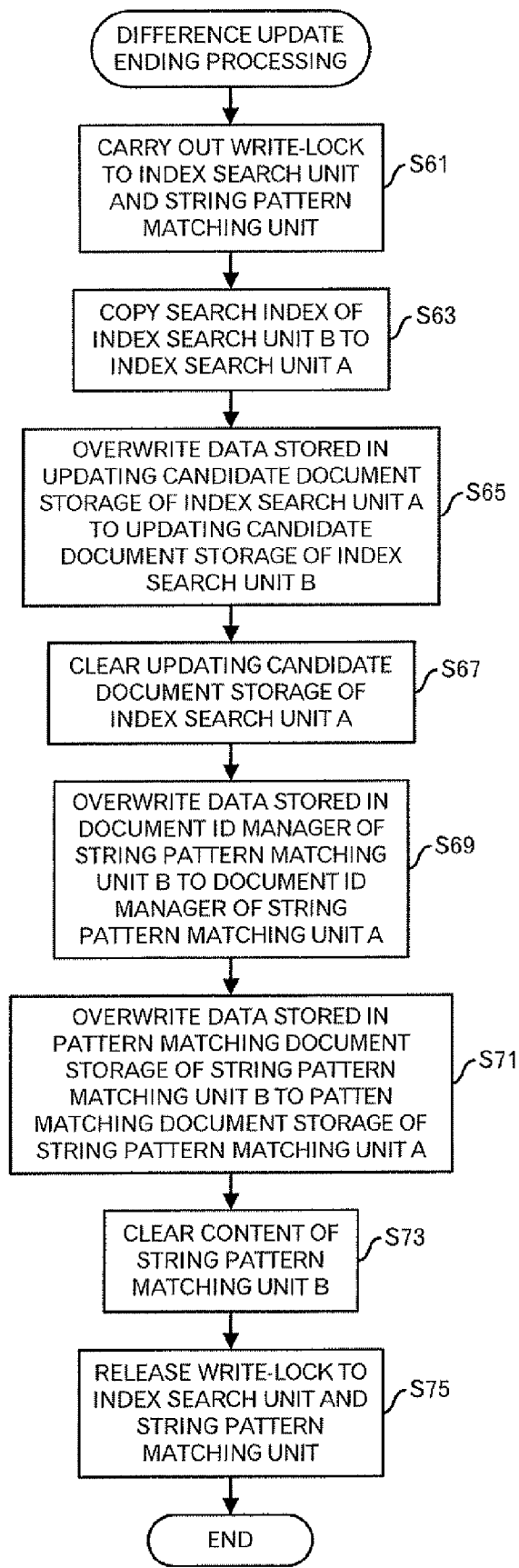
FIG. 23 is a diagram showing a processing flow of a difference update ending processing.

Next, a difference update ending processing carried out when the reflection of the updated document is completed by the index processor 131 of the index search unit B will be explained by using FIGS. 23 to 25. When the reflection processing of the updated document is completed, the index processor 131 of the index search unit B notifies the index search controller 5 of the completion. The index search controller 5 also notifies the string pattern matching controller 7 of the completion. Then, the index search controller 5 carries out the write-lock to the index search units A and B, and the string pattern matching controller 7 also carries out the write-lock to the string pattern matching units A and B (step S61).

Then, the index search controller 5 copies the search index of the index search unit B to the index processor 111 of the index search unit A (step S63). In addition, the index search controller 5 overwrites the data stored in the updating candidate document storage 113 of the index search unit A to the updating candidate document storage 133 of the index search unit B (step S65). Then, the index search controller 5 clears the updating candidate document storage 113 of the index search unit A (step S67).

While the reflection processing of the updated documents is carried out, the updating candidate document storage 133 of the index search unit B is not updated, and the contents of the updated documents is stored in the updating candidate document storage 113 of the index search unit A. Therefore, when the reflection processing of the updated documents for the search index is completed, the aforementioned processing is carried out to carry out preparation for the reflection processing to be carried out next.

Furthermore, the string pattern matching controller 7 overwrites the data stored in the document ID manager 171 of the string pattern matching unit B to the document ID manager 151 of the string pattern matching unit A (step 369). The string pattern matching controller 7 overwrites the data stored in the pattern matching document storage 173 of the string pattern matching unit B to the pattern matching document storage 153 of the string pattern matching unit A (step S71). In addition, the string pattern matching controller 7 clears the document ID manager 171 and the pattern matching document storage 173 of the string pattern matching unit B (step S73).

While the reflection processing of the updated documents is carried out for the search index, the string pattern matching units A and B are also updated. However, while the reflection processing of the updated documents is not carried out, only the string pattern matching unit A is updated. Therefore, the contents of the updated documents are stored into the string pattern matching unit B only while the reflection processing of the updated document is carried out. Therefore, after the search index is updated, the adequate search can be carried out by replacing the string pattern matching unit A with the contents of the string pattern matching unit B.

In addition, the index search controller 5 releases the write-lock for the index search units A and B, and the string pattern matching controller 7 releases the write-lock for the character string units A and B (step S75).

The difference update ending processing will be explained by using the aforementioned specific example. As shown in FIG. 24, the search index (the index for the document IDs "00001" to "00005") generated by the index processor 131 of the index search unit B is copied to the index processor 113 of the index search unit A. In addition, the document IDs "00001" and "00007" and their updated contents, which are stored in the updating candidate document storage 113 of the index search unit A, is moved to the updating candidate document storage 133 of the index search unit B by overwriting. Thus, the updating candidate document storage 113 of the index search unit A becomes "null".

Furthermore, the document IDs "00001" and "00007" as the data stored in the document ID manager 171 of the string pattern matching unit B is moved to the document ID manager 151 of the string pattern matching unit A by overwriting. Similarly, the document IDs "00001" and "00007" and their contents as the data stored in the pattern matching document storage 173 of the string pattern matching unit B is moved to the pattern matching document storage 153 of the character string unit A by overwriting. Thus, the document ID manager 171 and the pattern matching document storage 173 of the string pattern matching unit B become "null".

Figure 24:
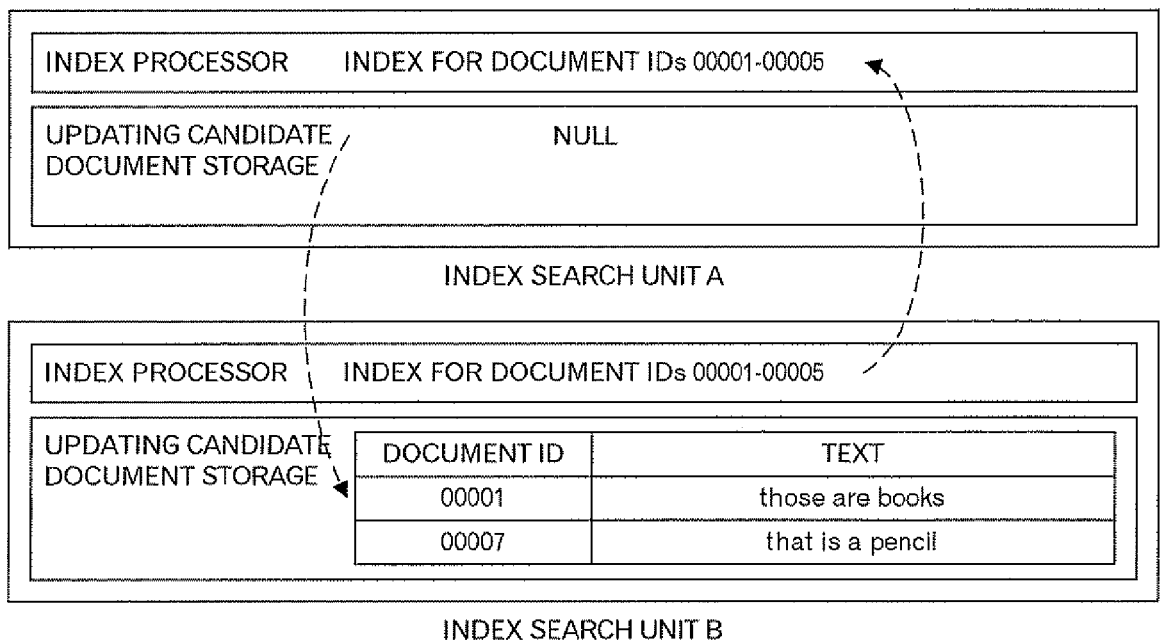
FIG. 24 is a diagram showing states of the index search units A and B.
Figure 25:
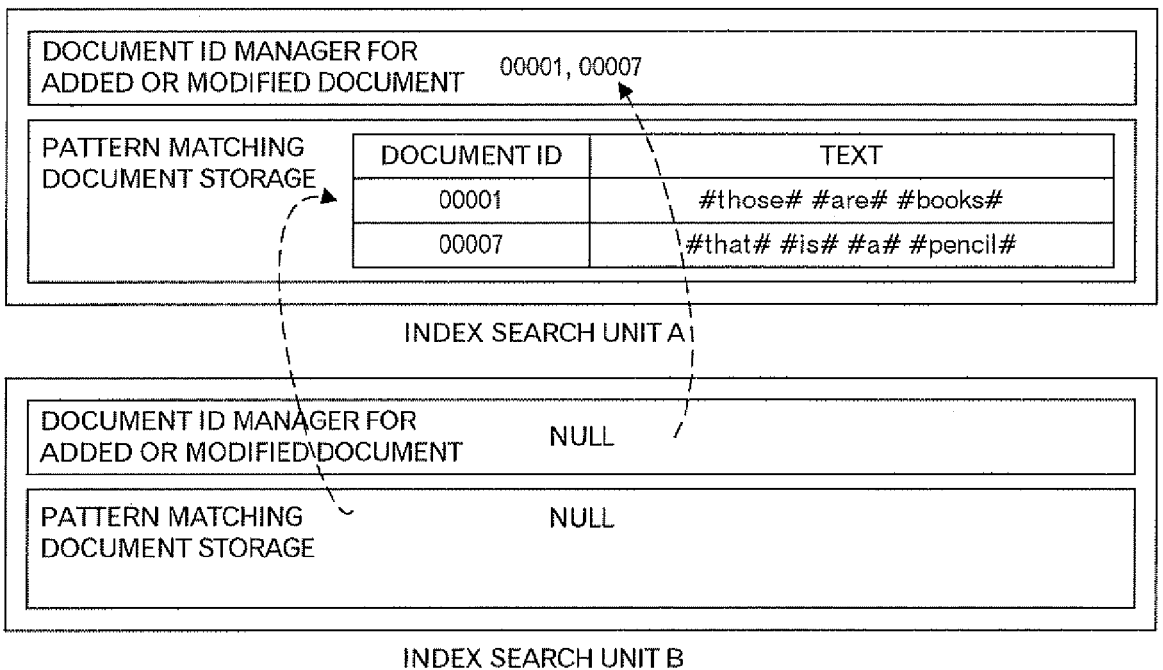
FIG. 25 is a diagram showing states of the string pattern matching units A and B.

After the states shown in FIGS. 24 and 25 are realized, when the search request containing the search key "IS" is received, the normalization processor 3 normalizes the search key to "is" for the index search, and converts the search key to "#is#" for the string pattern matching. The index search is carried out based on this "is" by the index processor 111 of the index search unit A. However, because the search index is constructed based on the data stored in the updating candidate document storage 133 shown in FIG. 17, the document IDs "00001", "00002" and "00004" are extracted as the search result of the index search. In addition, the string pattern matching controller 7 receives the list of the document IDs (document IDs "00001" and "00007") from the document ID manager 151 of the string pattern matching unit A, and subtracts the document IDs in the list from the search result of the index search, which was received from the index search controller 5. Then, the document IDs "00002" and "00004" are obtained.

In addition, when the pattern matching processor 9 carries out the pattern matching, processing based on "#is#", for the pattern matching document storage 153 of the string pattern matching unit A, the document ID "00007" can be obtained. Then, the string pattern matching controller 7 generates the sum-set of the document ID "00007" and the document IDs "00002" and "00004" to output the document IDs "00002", "00004" and "00007" as the search result.

Thus, while the search speed for the large volume of documents is maintained by the search index, the small volume of documents is treated by the string pattern matching carried out in parallel. Then, by appropriately synthesizing the search results of the index search and the string pattern matching and the document IDs of the updated documents, the accurate search result can be obtained at fast.

Figure 26:
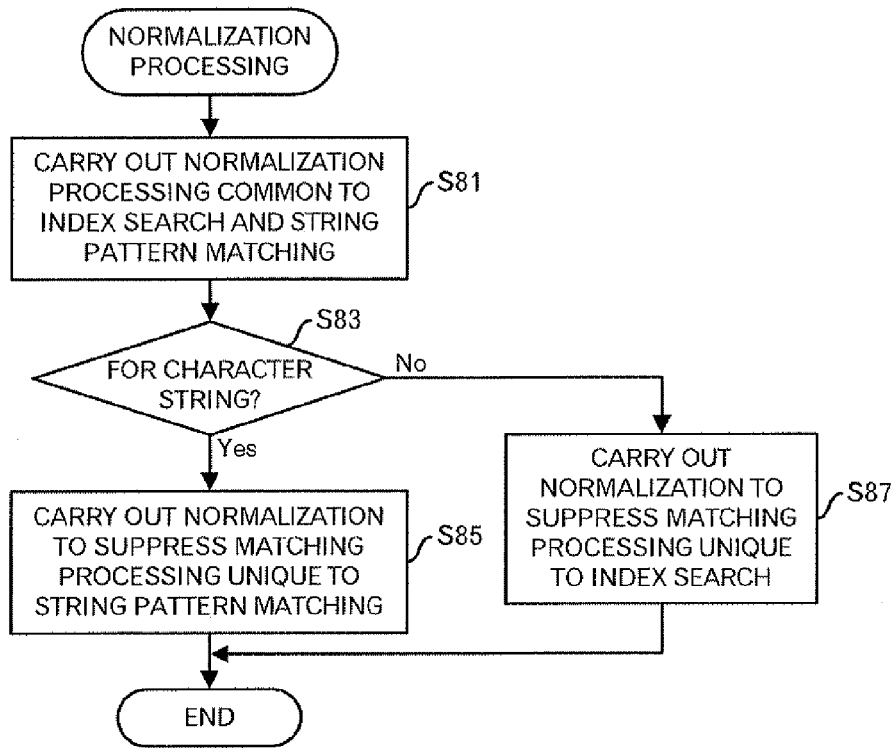
FIG. 26 is a diagram showing a processing flow of a normalization processing.

Next, the processing content of the normalization processor 3 is summarized by using FIG. 26. First, it carries out the common normalization processing for the index and the character string, and Stores the processing result into the storage device such as the main memory (step S81). For example, when "These are books" is processed, the case folding is carried out to obtain "these are books". Then, it judges whether or not this is for the normalization processing for the character string (step S83), and when the normalization processing for the index search has to be carried out, it carries out the normalization to suppress the matching processing unique to the index search (step S87). This result is "these are books", for example. In this embodiment, it is presumed that the processing to be suppressed is the stemming frequently used in the English information search, and because this processing is not applied, "books" is not converted to "book".

On the other hand, when the normalization processing for the string pattern matching has to be carried out, it carries out the normalization processing to suppress the matching processing unique to the character string (step S85). As for the matching unique to the character string, there is a matching with an arbitrary character string because of its characteristic. However, because it is assumed in this embodiment that the index is generated by the word unit and basically the word is identified by the space, a processing to add # before and after the character string sandwiched by the space is carried out. Thus, the input is converted to "#these# #are# #books#". Because the selection of the normalization processing depends on how the consistency between the search results of the index and the string pattern matching is realized in the language to be processed, various methods other than in this embodiment can be adopted.

Thus, the fast search can be carried out.

Although an embodiment of this invention has been described, this invention is not limited to this embodiment. For example, the functional block diagram shown in FIG. 1 is a mere example, and it does not always correspond to the actual program module configuration.

Furthermore, the steps, which are sequentially arranged in the processing flow, may be executed in parallel as long as the processing result is not changed. In addition, as long as the processing result is not changed, the order of the steps may be rearranged.

Figure 27:
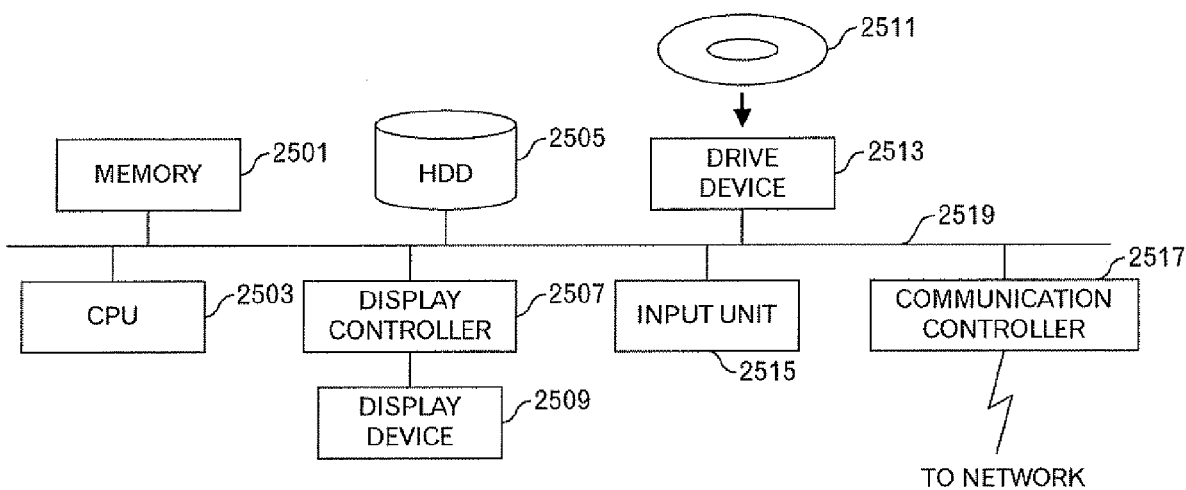
FIG. 27 is a functional diagram of a computer.

Incidentally, the search system in this embodiment is a computer device as shown in FIG. 27. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in detail are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A search processing method, comprising:
providing a system that includes an index search controller, a string pattern matching controller, an index search unit to carry out an index search using a search index before a document update, a string pattern matching unit having document contents after said document update, and a storage device;
said index search controller to cause said index search unit to carry out said index search relating to a search request, and obtaining and storing into said storage device, a first list of document IDs of pertinent documents;
said string pattern matching controller to cause said string pattern matching unit to carry out a character string pattern matching relating to said search request for said document contents after said document update, and obtaining and storing into said storage device, a second list of document IDs of pertinent documents;
said string pattern matching controller to generate a search result for said search request by removing from said first list, document IDs of documents updated by said document update, to generate a third list of document IDs obtained by said removing, and to generate a sum-set of said second list and said third list, wherein said search result includes said sum-set of said second list and said third list; and
said string pattern matching controller to output said search result.

2. The search processing method as set forth in claim 1, wherein said system further comprises a normalization processor, and
said search processing method further comprises:
said normalization processor to carry out a normalization processing for said index search against a search word relating to said search request; and
said normalization processor to carry out a normalization processing for said string pattern matching against said search word relating to said search request.

3. A search system, comprising:
a first search index;
an index search processor to carry out an index search for said first search index in response to a search request;
a first document ID manager, for added or modified document, that is used in search and stores document IDs of updated documents;
a first pattern matching document storage device that stores data of said updated documents;
a pattern matching processor to carry out a character string pattern matching for said first pattern matching document storage device in said search; and
a controller, and
wherein said index search processor to carry out said index search relating to said search request by using said first search index to obtain a first list of document IDs of pertinent documents,
said pattern matching processor to carry out said character string pattern matching relating to said search request for said first pattern matching document storage device to obtain a second list of document IDs of pertinent documents, and
said controller to remove from said first list, document IDs of documents updated after generation of said first search index, to generate a third list of document IDs obtained by the removing, to generate a sum-set of said second list and said third list, and to output a search result including said sum-set of said second list and said third list.

4. A search system, comprising:
a first search index that is used to carry out an index search in response to a search request;
a second search index that is used to reflect first updated documents;
a first updating candidate document storage device that stores data of second updated documents since a reflection processing of said first updated documents against said second search index began;
a second updating candidate document storage device that stores data of said first updated documents used for said reflection processing against said second search index;
a first document ID manager, for added or modified document, that is used in search and stores document IDs of said first updated documents;
a first pattern matching document storage device that stores said data of said first updated documents for a character string pattern matching in said search;
a second document ID manager, for added or modified document, that stores document IDs of said second updated documents since said reflection processing of said first updated documents against said second search index began;
a second pattern matching document storage device that stores said data of said second updated documents since said reflection processing of said first updated documents against said second search index began;
an index search controller; and
a string pattern matching controller, and
wherein, when said reflection processing of said first updated documents against said second search index is completed,
said index search controller to use said second search index after said reflection processing as said first search index by switching,
said index search controller to move said data of said second updated documents, which is stored in said first updating candidate document storage device, to said second updating candidate document storage device by overwriting,
said string pattern matching controller to move said document IDs of said second updated documents, which are stored in said second document ID manager, to said first document ID manager by overwriting, and
said string pattern matching controller to move said data of said second updated documents, which is stored in said second pattern matching document storage device, to said first pattern matching document storage device by overwriting.

5. The search system as set forth in claim 4, wherein, before said reflection processing of said first updated documents against said second search index begins,
said index search controller to store data of an updated document relating to a new update request into said first and second updating candidate document storage devices,
said string pattern matching controller to store a document ID of said update document relating to said new update request into said first document ID manager, and
said string pattern matching controller to store said data of said updated document relating to said new update request in said first pattern matching document storage device.

6. The search system as set forth in claim 5, wherein, after said reflection processing of said first updated document against said second search index began, said index search controller to clear said first updating candidate document storage device, said index search controller to store data of an updated document relating to a new update request in said first updating candidate document storage device, said string pattern matching controller to store said document ID of said updated document relating to said new update request into said first and second document ID managers, and said string pattern matching controller to store said data of said updated document relating to said new request is stored in said first and second pattern matching document storage devices.

7. The search system as set forth in claim 4, further comprising:

an index search processor to carry out an index search for said first search index in response to a search request;

a pattern matching processor to carry out a character string matching for said first pattern matching document storage device; and a controller, and wherein said index search processor to carry out said index search relating to said search request by using said first search index to obtain a first list of document IDs of pertinent documents, said pattern matching processor to carry out said string pattern matching relating to said search request for said first pattern matching document storage device to obtain a second list of document IDs of pertinent documents, and said controller to remove from said first list, document IDs of documents updated after generation of said first search index, to generate a third list of document IDs obtained by the removing, to generate a sum-set of said second list and said third list, and to output a search result including said sum-set of said second list and said third list.

8. The search system as set forth in claim 4, further comprising:

a normalization processor, and wherein said normalization processor to normalize said updated document stored in said first and second updated candidate document storage devices for said first and second search index, and said normalization processor to normalize said data of said updated documents stored in said first and second pattern matching document storages for said string pattern matching.

9. A computer readable storage medium storing a program for causing a computer to execute a search processing, comprising:

causing an index search unit for carrying out an index search using a search index before a document update to carry out said index search relating to a search request, and obtaining a first list of document IDs of pertinent documents;

causing a string pattern matching unit having document contents after said document update to carry out a string pattern matching relating to said search request for said document contents after said document update, and obtaining a second list of document IDs of pertinent documents; and generating a search result for said search request by removing from said first list, document IDs of documents undated by said document update, to generate a third list of document IDs obtained by said removing, and generating a sum-set of said second list and said third list, wherein said search result includes said sum-set of said second list and said third list; and said string pattern matching controller outputting said search result.

10. A computer readable storage medium storing a program for causing a computer to execute an updating process: said computer comprising:

a first search index that is used to carry out an index search in response to a search request;

a second search index that is used to reflect first updated documents;

a first updating candidate document storage device that stores data of second updated documents since a reflection processing of said first updated documents against said second search index began;

a second updating candidate document storage device that stores data of said first updated documents used for said reflection processing against said second search index;

a first document ID manager, for added or modified document, that is used in search and stores document IDs of said first updated documents;

a first pattern matching document storage device that stores said data of said first updated documents for a character string pattern matching in said search;

a second document ID manager, for added or modified document, that stores document IDs of said second updated documents since said reflection processing of said first updated documents against said second search index began;

a second pattern matching document storage device that stores said data of said second updated documents since said reflection processing of said first updated documents against said second search index began, and said updating process comprising:

when said reflection processing of said first updated documents against said second search index is completed, using said second search index after said reflection processing as said first search index by switching;

moving said data of said second updated documents, which is stored in said first updating candidate document storage device, to said second updating candidate document storage device by overwriting;

moving said document IDs of said second updated documents, which are stored in said second document ID manager, to said first document ID manager by overwriting, and moving said data of said second updated documents, which is stored in said second pattern matching document storage device, to said first pattern matching document storage device by overwriting.

* * * * *